(12) United States Patent
Huber et al.

(10) Patent No.: US 10,864,902 B2
(45) Date of Patent: Dec. 15, 2020

(54) CONTROL DEVICE, DRIVE TRAIN AND METHOD

(71) Applicant: Robert Bosch GmbH, Stuttgart (DE)

(72) Inventors: Alexander Huber, Stuttgart (DE); Andreas Greis, Stuttgart (DE); Juergen Biester, Boeblingen (DE); Rajendra Prasad Bandi, Bangalore (IN)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 15/768,869

(22) PCT Filed: Sep. 9, 2016

(86) PCT No.: PCT/EP2016/071302
§ 371 (c)(1),
(2) Date: Apr. 17, 2018

(87) PCT Pub. No.: WO2017/067703
PCT Pub. Date: Apr. 27, 2017

(65) Prior Publication Data
US 2020/0238969 A1    Jul. 30, 2020

(30) Foreign Application Priority Data
Oct. 19, 2015   (DE) .................. 10 2015 220 275

(51) Int. Cl.
*B60W 20/10* (2016.01)
*B60W 10/06* (2006.01)
*B60W 10/08* (2006.01)

(52) U.S. Cl.
CPC ............ *B60W 20/10* (2013.01); *B60W 10/06* (2013.01); *B60W 10/08* (2013.01);
(Continued)

(58) Field of Classification Search
CPC ...... B60W 20/10; B60W 10/08; B60W 10/06; B60W 2710/081; B60W 2710/0644;
(Continued)

(56) References Cited

U.S. PATENT DOCUMENTS

| 5,289,890 A | * | 3/1994 | Toyoda | ................... | B60K 1/02 180/65.8 |
| 7,650,954 B2 | * | 1/2010 | Ibenthal | ................... | B60K 6/48 180/65.28 |

(Continued)

FOREIGN PATENT DOCUMENTS

| CN | 101624051 A | 1/2010 |
| CN | 104181516 A | 12/2014 |

(Continued)

OTHER PUBLICATIONS

International Search Report for Application No. PCT/EP2016/071302 dated Dec. 19, 2016 (English Translation, 2 pages).

*Primary Examiner* — Michael J Zanelli
(74) *Attorney, Agent, or Firm* — Michael Best & Friedrich LLP (57) ABSTRACT

The invention relates to a control device (1) for a vehicle having at least two drive units, comprising a first interface (3) which is designed to record a target torque (4), and comprising a computer device (5) which is designed to cyclically minimise an evaluation function (6) for the operation of the at least two drive units, in order to determine a torque distribution (11) between the at least two drive units, wherein a boundary condition (7) of the evaluation function (6) is the generation of the target torque (4), wherein the evaluation function (6) has a penalty term (8), which evidences a change in the torque of one of the at least two drive units with an evaluation penalty. The invention also relates to a corresponding drive train and a corresponding method.

9 Claims, 6 Drawing Sheets

(52) U.S. Cl.
CPC ............... *B60W 2710/0644* (2013.01); *B60W 2710/0666* (2013.01); *B60W 2710/081* (2013.01); *B60W 2710/083* (2013.01)

(58) Field of Classification Search
CPC .... B60W 2710/083; B60W 2710/0666; B60K 6/48; Y02T 10/6221; Y02T 10/6286; Y02T 10/84
See application file for complete search history.

(56) References Cited

U.S. PATENT DOCUMENTS

| | | | |
|---|---|---|---|
| 8,700,245 B2 * | 4/2014 | Meitinger | ............... B60K 6/448 701/22 |
| 2005/0246076 A1 | 11/2005 | Chen et al. | |
| 2015/0217779 A1 | 8/2015 | Schmoll Genannt Eisenwerth et al. | |

FOREIGN PATENT DOCUMENTS

| | | | |
|---|---|---|---|
| DE | 102010008695 | | 8/2011 |
| DE | 102012214252 | | 2/2014 |
| EP | 1388454 | A2 | 2/2004 |
| EP | 1415838 | A1 | 5/2004 |
| GB | 2500944 | | 10/2013 |
| JP | 2013-107587 | * | 6/2013 |

* cited by examiner

Fig. 6

CONTROL DEVICE, DRIVE TRAIN AND METHOD

BACKGROUND OF THE INVENTION

The present invention relates to a control device for a vehicle having at least two drive units. In addition, the present invention relates to a corresponding drive train and a corresponding method.

In modern vehicles, different techniques are used to reduce the consumption of fuel. For example attempts are made to reduce the weight of the vehicles in order to reduce their consumption. In addition to such a reduction in weight, in modern vehicles two drive motors are also used which are intended to complement one another. For example, an electric motor can be used very efficiently to accelerate a vehicle from the stationary state, since it can already provide a maximum torque starting from a rotational speed of zero. In contrast, an internal combustion engine can be used for very long distances since the energy density of petrol or diesel is very high.

Vehicles which have an internal combustion engine and an electric motor are also referred to as hybrid vehicles. An important component of such vehicles is a controller which controls the torque distribution between the electric motor and the internal combustion engine. Said controller therefore controls whether the engine or the motor output torque to the wheels of the vehicle, and how much torque it outputs.

DE 10 2012 214 252 A1 discloses a corresponding vehicle and a method for controlling a hybrid vehicle.

SUMMARY OF THE INVENTION

The present invention discloses a control device, a drive train and a method.

Accordingly the following is provided:

A control device for a vehicle having at least two drive units, having a first interface which is designed to record a target torque, and having a computer device which is designed to cyclically minimize an evaluation function for the operation of the at least two drive units, in order to determine a load distribution and therefore also torque distribution between the at least two drive units, wherein a boundary condition of the evaluation function is the generation of the target torque, wherein the evaluation function has a penalty term which indicates a change in the torque of one of the at least two drive units with an evaluation penalty.

In addition the following is provided:

A drive train for a vehicle, having at least two drive units, and having a control device according to the invention, which is coupled to the at least two drive units and is designed to actuate them.

Finally the following is provided:

A method for controlling a vehicle having at least two drive units, comprising the steps: recording a target torque, cyclically minimizing an evaluation function for the operation of the at least two drive units, in order to determine a load distribution between the at least two drive units, wherein a boundary condition of the evaluation function is the generation of the target torque, wherein the evaluation function has a penalty term which indicates a change in the torque of one of the at least two drive units with an evaluation penalty.

The control device uses a minimization strategy. In this context, the evaluation function can be e.g. a function which maps the consumptions of the respective drives onto an evaluation value which is to be minimized, for a given rotational speed and a given torque of the drives. The ratio of the torques applied by each of the drive units and the change in this ratio can also be referred to as an operating strategy of the drive system.

For example, an operating strategy can provide an acceleration of a passenger car from the stationary state that is carried out with an electric motor which has a high torque even at low rotational speeds. Starting from a certain velocity, e.g. an internal combustion engine can be actuated, said internal combustion engine assisting sliding at a constant speed. Further considerations during the selection of the operating strategy can be e.g. the state of charge of a battery of the electric motor, a temperature of the motors and the like. The objective of the operating strategy is here always to find the most efficient distribution of the torques between the drive units for a torque which is desired by a driver. That is to say the distribution which permits the lowest consumption of fuel or energy.

A vehicle with a drive train according to the invention can be e.g. a hybrid vehicle which has a conventional internal combustion engine and an electric motor. Said engine and motor can usually drive the vehicle jointly with a controllable torque ratio.

If the control device has determined a distribution of the torques between the drive units, it can, of course, actuate them correspondingly. In this context, the control device can itself therefore actuate the drive units directly. Alternatively, the control device can transmit information about the distribution of the torques between the drive units, but also to further control units, e.g. dedicated engine/motor control units.

A possible exemplary formula for the evaluation function is as follows:

$$H(n)=s^*P_{Batt}(n)+H_u{}^*m_{Fuel,ICE}(n)$$

The secondary condition can be formulated as follows:

$$T_{ICE}+T_{EM}+T_{drv,des}$$

Here, $T_{ICE}$ stands for the torque of the internal combustion engine, $T_{EM}$ stands for the torque with the electric motor, and $T_{drv,des}$ stands for the target torque which is predefined by the driver. The sum of the torque of the internal combustion engine and the torque of the electric motor must consequently correspond to the torque desired by the driver. $H(n)$ stands for the result of the evaluation function which is to be minimized. $P_{Batt}(n)$ stands for the power extracted from the battery an electric motor at a predefined rotational speed n. Said power is multiplied by an equivalent factor s which equates the electrical power to a consumption of fuel of a corresponding internal combustion engine. The term $m_{Fuel,ICE}(n)$ stands for a flow of fuel or mass flow of the fuel at a predefined rotational speed and $H_u$ stands for the energy content of the fuel. For the minimization of $H(n)$, a rotational speed is predefined by the driver and, in particular, the terms $PBatt(n)$ and $m_{Fuel,ICE}(n)$ can be made available as a function of the torque.

In particular when an electric motor is combined with an internal combustion engine, e.g. a diesel engine, in a passenger car, an evaluation function or the output curve of such a function can have a very flat profile over wide rotational speed ranges or torque ranges, and can have several local minimum values which are very close to one another for different torques. This can give rise to oscillations between two or more of the minimum values which are close to one another. In order to generate the same output torque, the torque distribution is therefore switched continuously between the electric motor and the diesel engine, that is to say between two or more distributions which are equivalent in terms of their result. However, in passenger car this switching can give rise e.g. to perceptible vibrations.

In order to avoid this, the penalty term is introduced which widens the evaluation function by a term which indicates a change in the target torque or the target load of one of the at least two drive units with an evaluation penalty. This means that a change in the target torque of one of the drive units therefore has a negative effect in the result of the evaluation function, that is to say increases it.

The evaluation function can be represented with the penalty term as follows:

$$H(n)=s*P_{Batt}(n)+H_u*m_{FuelJCE}(n)+TM(T)$$

where TM(T) stands for the penalty term which is dependent on the torque of one of the drive units.

Since the goal is to minimize the evaluation function, a new minimum value in the case of a change in the distribution of the torque between the drive units is found only when savings occur which exceed the evaluation penalty. As explained above, the jumps between two local minimum values which are close to one another take place because the curve of the evaluation function has a very flat profile. However, this also means that in the case of small changes of the distribution, e.g. between two of the local minimum values, savings hardly occur and the penalty term prevents oscillating switching.

Advantageous embodiments and developments are apparent from the subclaims and from the description with reference to the figures.

In one embodiment, the penalty term can have the absolute value of a difference between a torque calculated for one of the drive units in a current calculation cycle and a torque calculated for the respective drive unit in a preceding calculation cycle. The penalty term can alternatively have the square of a difference between a torque calculated for one of the drive units in a current calculation cycle and a torque calculated for the respective drive unit in a preceding calculation cycle. During the already mentioned switching between two equivalent torque distributions, under certain circumstances the result of the evaluation function changes only to a very small extent. The torques of the drive units however change significantly. Therefore, a penalty term which is based on the change in the torques can effectively prevent such switching.

The penalty term TM can be configured e.g. as follows:

$$TM(T)=\text{abs}(T_k-T_{k-1})$$

or as follows:

$$TM(T)=w*(T_k-T_{k-1})^2$$

where $T_k$ stands for the torque calculated in the current calculation cycle and $T_{k-1}$ stands for the torque calculated in the preceding calculation cycle. The factor w can be a weighting factor with which the influence of the penalty term can be adjusted.

In one embodiment, the penalty term can have a predefined maximum value which limits the evaluation penalty. This permits a threshold to be defined starting from which a changeover between two torque distributions of the drive units is carried out. It is possible e.g. for a separate maximum value to be calculated or determined experimentally for each combination of drive units. Such a threshold value must, on the one hand, ensure that oscillations do not occur in the drive train e.g. of a passenger car. On the other hand, the threshold value must be selected with such a low value that the efficiency of the drive train is not adversely affected, e.g. because switching over between two torque distributions is prevented in a sustained fashion.

Such a penalty term can be configured as follows:

$$TM(T)=\max(T_{lim},\text{abs}(T_k-T_{k-1}))$$

or as follows:

$$TM(T)=\max(T_{lim}^2,w*(T_k-T_{k-1})^2)$$

If the penalty therefore exceeds the maximum value $T_{lim}$, the value of the penalty term does not increase further.

In one embodiment, the computer device can be designed to monitor operational variables of the drive unit and to execute a new calculation cycle only when at least one of the operational variables changes by a predefined threshold value. For example, the computer device can have a memory and can store the current values of the operational variables in each calculation cycle. After a calculation cycle, the computer device then merely monitors the changes in the operational variables. A new calculation cycle is triggered only when the change in an operational variable is above a certain threshold value. Frequently recalculations of the operational strategy can be avoided, and high-frequency cyclical or oscillating jumps between torque distributions can be avoided or reduced.

In one embodiment, the computer device can be designed to detect a desired torque and/or a maximum and/or minimum torque which can be applied by the drive units and/or rotational speeds of the drive units as operational variables. This permits the drive units and the drive train in which they are used to be monitored in a very detailed fashion and permits changing conditions to be detected.

The above refinements and developments can, where appropriate, can be combined with one another as desired. Further possible refinements, developments and implementations of the invention also comprise non-explicitly mentioned combinations of features of the invention which have been described above or are described below with respect to the exemplary embodiments. In particular, in this context a person skilled in the art will also add individual aspects as improvements or additions to the respective basic form of the present invention.

BRIEF DESCRIPTION OF THE DRAWINGS

The present invention will be explained in more detail below on the basis of the exemplary embodiments disclosed in the schematic figures of the drawings. In the drawings.

In all the figures, identical or functionally identical elements and devices have been provided with the same reference symbols, unless stated otherwise.

DETAILED DESCRIPTION

Figure 1:
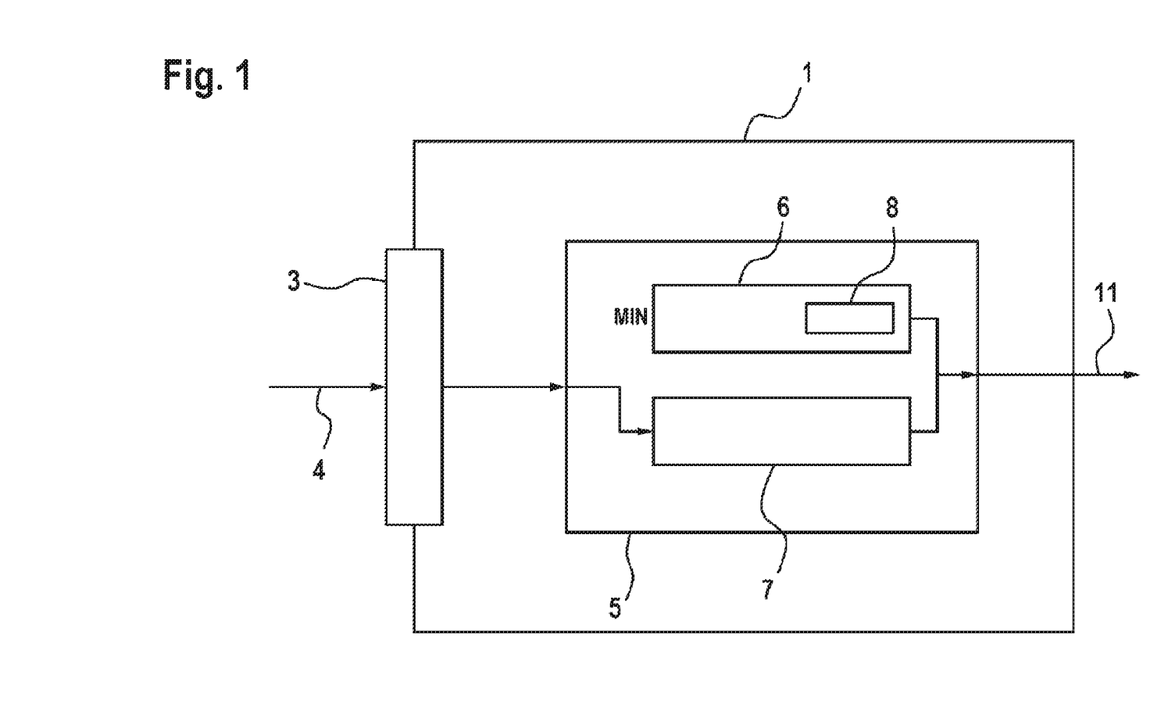
FIG. 1 shows a block circuit diagram of an embodiment of a control device according to the invention.

FIG. 1 shows a block circuit diagram of an embodiment of a control device 1 according to the invention with an interface 3 via which the control device 1 receives a target torque 4. The target torque 4 can be derived e.g. from an accelerator pedal position which a driver in a vehicle sets with his foot. However, the target torque 4 can e.g. also be made available by other vehicle systems such as e.g. a cruise controller or the like. The interface 3 can be here any type of interface which permits the transmission of the target torque as an analog value or digital value. In particular, the interface 3 can be embodied as a bus interface 3, e.g. a CAN interface or a FlexRay interface or the like.

In the control device 1 a computer device 5 processes the target torque 4 by using it as a boundary condition for minimizing MIN the evaluation function 6 with the penalty term 8. The evaluation function 6 forms models, as mentioned above, a specific power distribution between the drive units to a value which permits definitive information to be made about the efficiency of the corresponding power distribution and can be embodied e.g. as follows:

$$H(n) = s^* P_{Batt}(n) + H_u^* m_{Fuel,ICE}(n) + \max(T_{lim}^2, w^*(T_k - T_{k-1})^2)$$

wherein the penalty term $\max(T_{lim}^2, w^*(T_k-T_{k-1})^2)$ represents the penalty term 8. $T_{lim}$ represents a maximum value 9 for the penalty term. The penalty term therefore cannot exceed the latter.

The abovementioned formula supplies as H(n) a value which characterizes the efficiency of a power distribution or load distribution between an electric motor and an internal combustion engine. If this value becomes minimal, the electric motor and internal combustion engine operate in combination for the respective load situation in an optimum way, that is to say in the most efficient way.

The computer device 5 can output the calculated load distribution or torque distribution 11 directly to the respective drive units, that is to say e.g. an electric motor and an internal combustion engine, in order to actuate them. Alternatively, the computer device 5 can also transfer this information e.g. to a superordinate drive control unit which performs the actual actuation of the drive units. The outputting of load distribution 11 can, of course, also occur via the interface 3.

Figure 2:
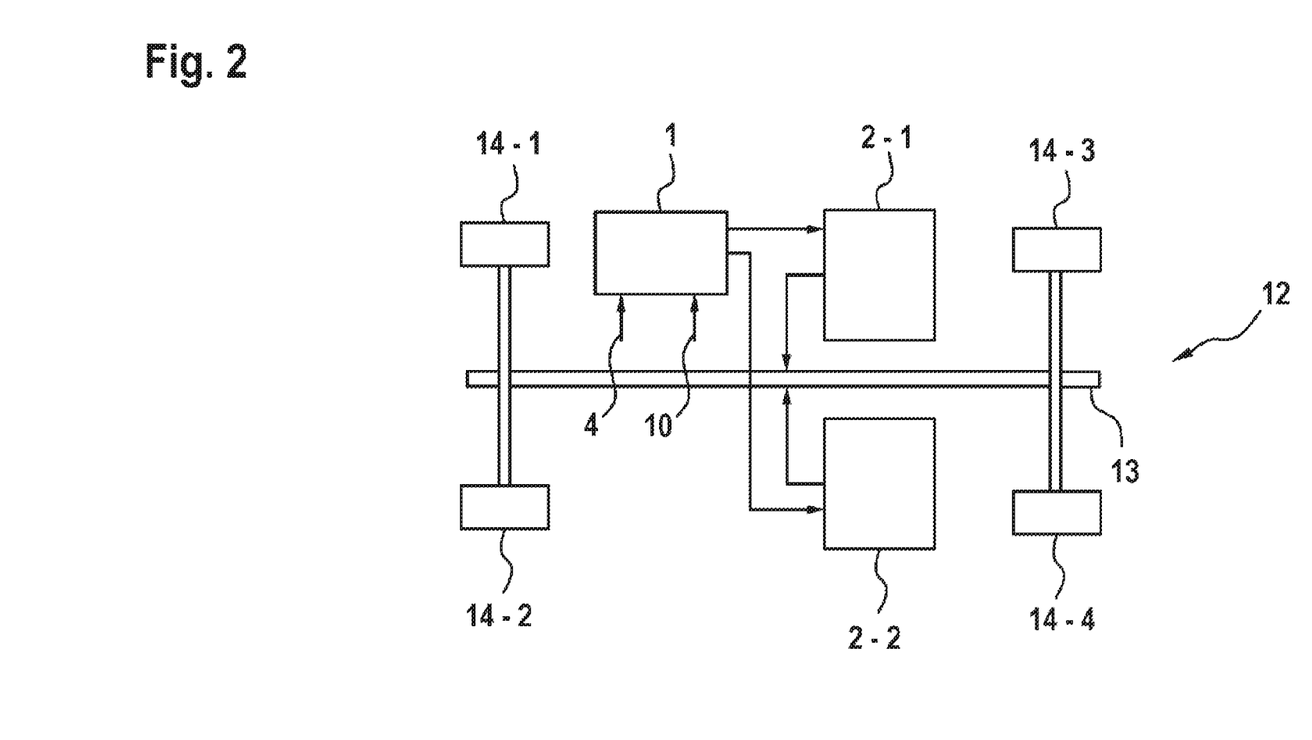
FIG. 2 shows a block circuit diagram of an embodiment of a drive train according to the invention.

FIG. 2 shows a block circuit diagram of an embodiment of a drive train 12 according to the invention.

The drive train 12 has an electric motor 2-1 and an internal combustion engine 2-2 which are both coupled to a drive shaft 13 and via the latter to the wheels 14-1 to 14-4 of the drive train 12. Since the electric motor 2-1 and the internal combustion engine 2-2 are coupled in parallel with the drive shaft 13, this is a so-called "parallel hybrid". Alternatively, the electric motor 2-1 and the internal combustion engine 2-2 can also be arranged mechanically in series.

In FIG. 2, the control device 1 also picks up further operational variables 10 of the drive train 12 in addition to the target torque. These operational variables 10 can be e.g. a desired torque, a maximum or minimum torque which can be applied by the electric motor 2-1 and the internal combustion engine 2-2 or rotational speeds of the electric motor 2-1 and of the internal combustion engine 2-2.

The control device 1 has an expanded function in comparison with FIG. 1. The control device 1 has calculated a load distribution 11, it does not immediately calculate a new load distribution 11. Instead, the control device 1 observes the operational variables 10 and merely then calculates a new load distribution 11 for the electric motor 2-1 and the internal combustion engine 2-2 if the operational variables change by a certain threshold value. This threshold value can, depending on the operational variable, be specified as an absolute percentage value. For example, in one embodiment the control device 1 can calculate a new load distribution 11 for the electric motor 2-1 and the internal combustion engine 2-2 if the target torque has changed by more than 1%, 5%, 10% or a value between the other values.

When the evaluation function 6 is minimized, the computer device 1 in FIG. 2 is also designed to limit the penalty term to a maximum value 9. Consequently, the penalty term cannot rise above the maximum value 9 in any situation. The effects of this limitation are explained in more detail in relation to FIG. 6.

Figure 3:
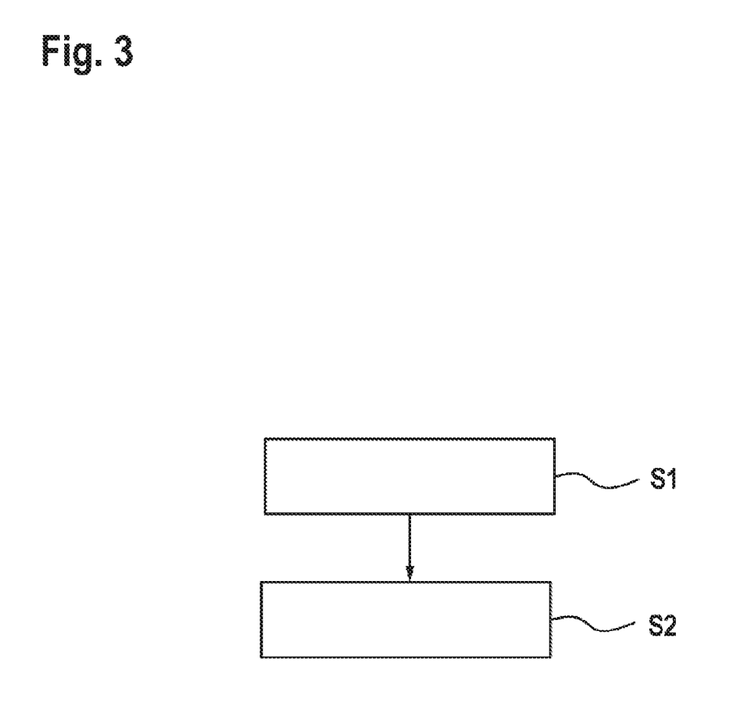
FIG. 3 shows a flowchart of an embodiment of a method according to the invention.

FIG. 3 shows a flowchart of an embodiment of a method according to the invention for controlling a vehicle with at least two drive units 2-1, 2-2.

The method starts with the recording S1 of the target torque 4. In order to determine the torque distribution 11, an evaluation function 6 with the operation of the at least two drive units 2-1, 2-2 is minimized cyclically S2. A boundary condition 7 of the evaluation function 6 is the generation of the target torque 4. As already mentioned above, the evaluation function 6 has a penalty term 8 which indicates a change in the torque of one of the at least two drive units 2-1, 2-2 with an evaluation penalty.

Different embodiments of the penalty term 8 can be used in the method. For example, the penalty term 8 can have the absolute value of a difference between a torque calculated for one of the drive units 2-1, 2-2 in a current calculation cycle and a torque calculated for the respective drive unit 2-1, 2-2 in a preceding calculation cycle. Alternatively, the penalty term 8 can have the square of a difference between a torque calculated for one of the drive units 2-1, 2-2 in a current calculation cycle and a torque calculated for the respective drive unit 2-1, 2-2 in a preceding calculation cycle. Finally, the penalty term 8 can have a predefined maximum value 9 which limits the evaluation penalty.

Figure 4:
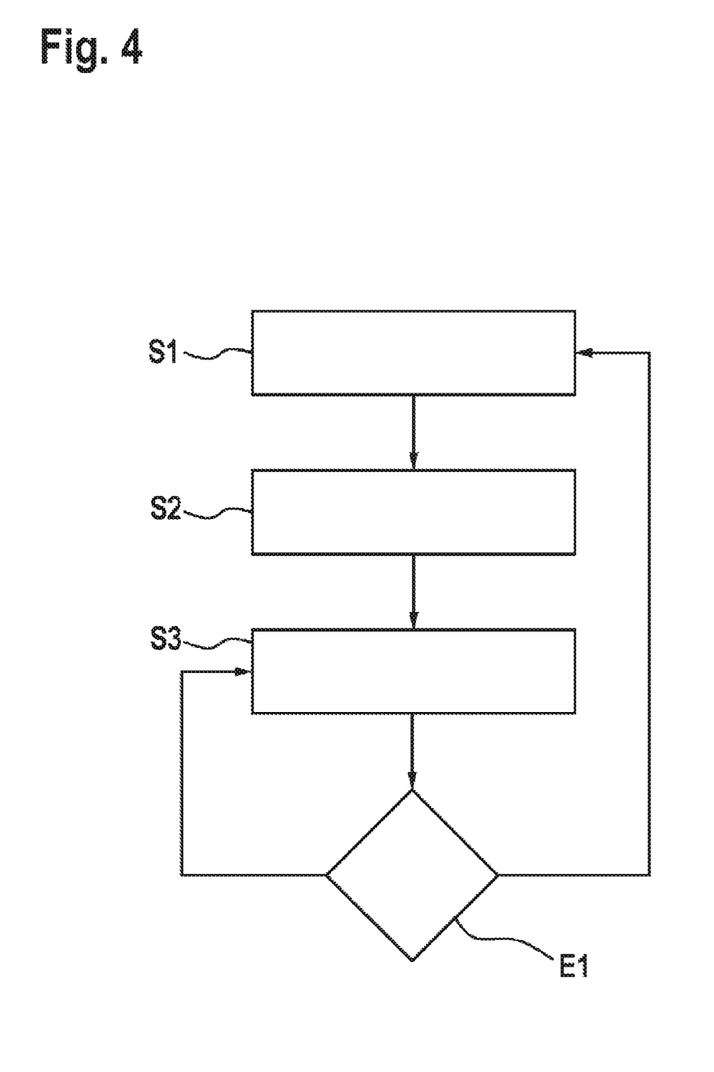
FIG. 4 shows a flowchart of a further embodiment of a method according to the invention.

FIG. 4 shows a flowchart of a further embodiment of a method according to the invention which adds to or expands the method in FIG. 3.

After the minimization of the evaluation function 6 and the associated calculation of the load distribution 11 at step S2, the method in FIG. 3 provides operational variables 10 of the drive units 2-1, 2-2 that are monitored S3 and a new calculation cycle is executed only when at least one of the operational variables 10 changes by a predefined threshold value. This is illustrated in FIG. 3 by the decision block E1 which leads back to step S3 if the operational variables 10 have not changed at least by the predefined threshold value. If a change occurs whose magnitude is above the predefined threshold value, the method starts again at step S1.

In this context e.g. a desired torque and/or a maximum and/or minimum torque which can be applied by the drive units 2-1, 2-2 and/or rotational speeds of the drive units 2-1, 2-2 can be detected as operational variables 10.

Figure 5:
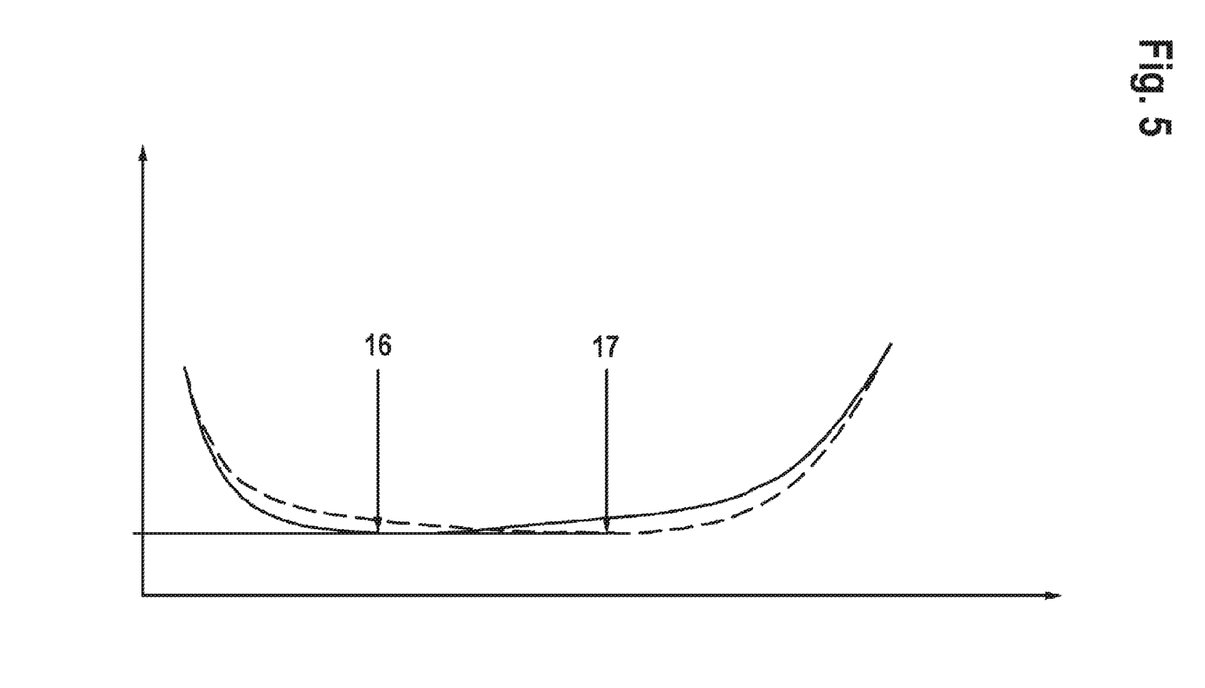
FIG. 5 shows a diagram of an embodiment of an exemplary evaluation function.

FIG. 5 shows a diagram of an embodiment of an exemplary evaluation function. The ordinate axis of the diagram shows the value of the evaluation function, that is to say H(n), while the abscissa axis shows the torque of one of the drive units. A representation of measured values has been dispensed with, since they are not relevant for understanding the principle of the present invention and different measured values would occur for different drive units.

The diagram shows two curves for different, requested rotational speeds. The curves in the diagram have an approximately trough-shaped profile and have a wide central region in which they have an approximately horizontal profile. The curves do not have a precisely horizontal profile here but rather each have local minimum values 16 and 17. It is clearly apparent that the minimum values 16 and 17 give rise to approximately the same result of the evaluation function. The corresponding load distributions 11 therefore have the same efficiency level. The distance between the two minimum values with respect to the abscissa axis is so small here that a change over between the two minimum values 16 and 17 could already occur if e.g. the driver of a vehicle keeps the accelerator pedal approximately constant and varies it very slightly.

By using the present invention it is possible to avoid oscillation between the minimum values 16 and 17. Oscillations which are perceptible to the driver of a vehicle can therefore be avoided.

Figure 6:
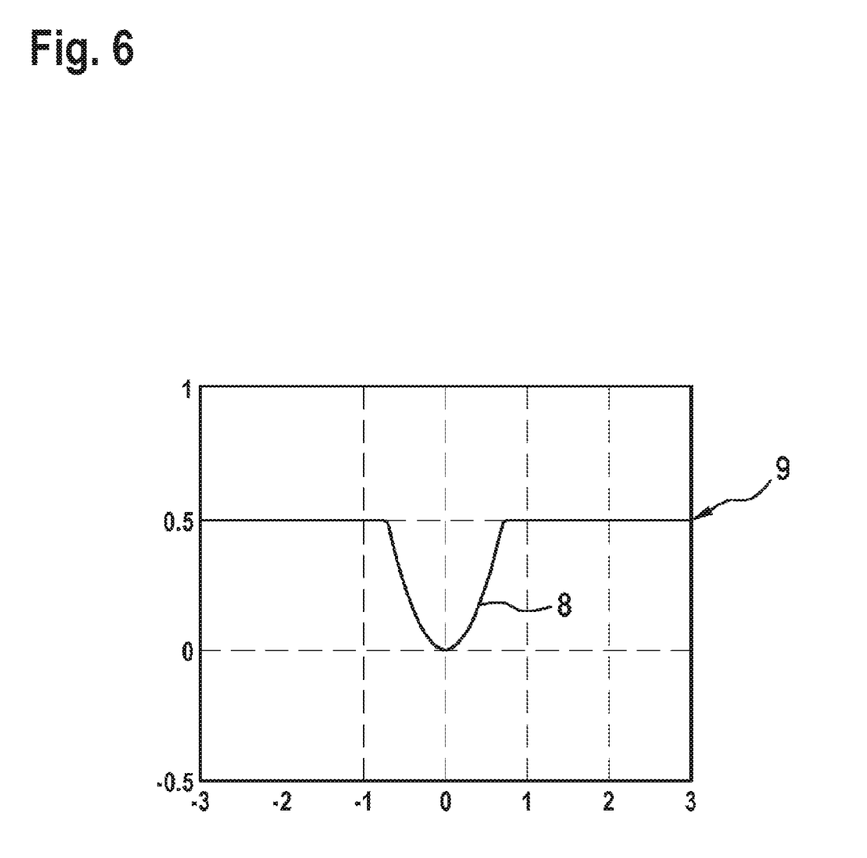
FIG. 6 shows a diagram of an embodiment of an exemplary penalty term.

FIG. 6 shows a diagram of an embodiment of an exemplary penalty term 8. The ordinate axis of FIG. 6 characterizes the absolute value of the penalty term 8, and the abscissa axis characterizes the square of the difference between a torque calculated for one of the drive units 2-1, 2-2 in a current calculation cycle and a torque calculated for the respective drive unit 2-1, 2-2 in a preceding calculation cycle. It is also apparent in FIG. 6 that the penalty term 8 has a maximum value 9 of 0.5. The penalty term is therefore limited to this maximum value 9 and cannot assume a larger value.

As a result of the predefinition of the maximum value 9, an interval can be predefined in which the penalty term 8 is effective. For differences outside this interval, here approximately ±0.75, the penalty term always has the same absolute value. It therefore acts on all the differences outside the interval in the same way. If the computer device 5 therefore finds e.g. two minimum values for the evaluation function 6 in the case of torque differences of −1 and −2 compared to the preceding calculation cycle, the values of the evaluation function are comparable with one another independently of the penalty term, since said penalty term is included with precisely the same absolute value in both values.

Although the present invention has been described above on the basis of preferred exemplary embodiments, it is not restricted thereto but can be modified in a variety of ways. In particular, the invention can be changed or modified in various ways without departing from the core of the invention.

The invention claimed is:

1. A control device (1) for a vehicle having at least two drive units (2-1, 2-2), the control device comprising:
    an interface (3) configured to record a target torque (4), and
    a computer device (5) configured to cyclically minimize an evaluation function (6) for the operation of the at least two drive units (2-1, 2-2), in order to determine a torque distribution (11) between the at least two drive units (2-1, 2-2), wherein a boundary condition (7) of the evaluation function (6) is the target torque (4), and actuate the at least two drive units (2-1, 2-2) according to the determined torque distribution (11),
    wherein the evaluation function (6) has a penalty term (8) which indicates a change in the torque of one of the at least two drive units (2-1, 2-2) with an evaluation penalty, and
    wherein the penalty term (8) has the absolute value of a difference between a torque calculated for one of the drive units (2-1, 2-2) in a current calculation cycle and a torque calculated for the respective drive unit (2-1, 2-2) in a preceding calculation cycle or wherein the penalty term (8) has the square of a difference between a torque calculated for one of the drive units (2-1, 2-2) in a current calculation cycle and a torque calculated for the respective drive unit (2-1, 2-2) in a preceding calculation cycle.

2. The control device (1) as claimed in claim 1, wherein the penalty term (8) has a predefined maximum value (9) which limits the evaluation penalty.

3. The control device (1) as claimed in claim 1, wherein the computer device (5) is configured to monitor operational variables (10) of the drive units (2-1, 2-2) and to execute a new calculation cycle only when at least one of the operational variables (10) changes by a predefined threshold value.

4. The control device (1) as claimed in claim 3, wherein the computer device (5) is configured to detect at least one selected from the group consisting of a desired torque, a maximum torque, and a minimum torque which can be applied by either or both of the drive units (2-1, 2-2) as operational variables (10).

5. A drive train (12) for a vehicle,
    having at least two drive units (2-1, 2-2), and
    having a control device (1) as claimed in claim 1, which is coupled to and configured to actuate the at least two drive units (2-1, 2-2).

6. A method for controlling a vehicle having at least two drive units (2-1, 2-2), the method comprising:
    recording (S1) a target torque (4),
    determining a torque distribution (11) between the at least two drive units (2-1, 2-2) by cyclically minimizing (S2) an evaluation function (6) for the operation of the at least two drive units (2-1, 2-2), wherein the evaluation function (6) includes a boundary condition (7) that is the target torque (4) and a penalty term (8) which indicates a change in the torque of one of the at least two drive units (2-1, 2-2) with an evaluation penalty, and
    actuating the at least two drive units (2-1, 2-2) according to the determined torque distribution (11),
    wherein the penalty term (8) has the absolute value of a difference between a torque calculated for one of the drive units (2-1, 2-2) in a current calculation cycle and a torque calculated for the respective drive unit (2-1, 2-2) in a preceding calculation cycle or wherein the penalty term (8) has the square of a difference between a torque calculated for one of the drive units (2-1, 2-2) in a current calculation cycle and a torque calculated for the respective drive unit (2-1, 2-2) in a preceding calculation cycle.

7. The method as claimed in claim 6, wherein the penalty term (8) has a predefined maximum value (9) which limits the evaluation penalty.

8. The method as claimed in claim 6, wherein operational variables (10) of the drive units (2-1, 2-2) are monitored (S3), and a new calculation cycle is executed only when at least one of the operational variables (10) changes by a predefined threshold value.

9. The method as claimed in claim 8, wherein at least one selected from the group consisting of a desired torque, a maximum torque, and a minimum torque which can be applied by the drive units (2-1, 2-2) are detected as operational variables (10).

* * * * *